United States Patent

[11] 3,634,676

| [72] | Inventor | Angelo Castellano<br>2710 Walnut Street, Tampa, Fla. 33607 |
|---|---|---|
| [21] | Appl. No. | 21,814 |
| [22] | Filed | Mar. 23, 1970 |
| [45] | Patented | Jan. 11, 1972 |

[54] COMBINED SPECTACLE FRAME AND LIGHT
6 Claims, 5 Drawing Figs.

[52] U.S. Cl..................................... 240/6.4 W,
224/5 H, 240/2 ME, 240/10.66, 240/10.67, 240/59
[51] Int. Cl..................................... F21l 9/00, F21l 15/14
[50] Field of Search........................... 240/2 MA, 6.4 W, 59, 10.67, 10.69, 10.66, 2 M, 2 MT, 2 ME; 224/5 H, 25 R, 28 C

[56] References Cited
UNITED STATES PATENTS

| 1,832,563 | 11/1931 | Kuhn.......................... | 240/10.67 |
| 1,986,281 | 1/1935 | Nygard........................ | 240/10.67 |
| 2,401,366 | 6/1946 | Muldoon..................... | 240/10.67 |
| 2,638,532 | 5/1953 | Brady......................... | 240/59 |

*Primary Examiner*—Louis R. Prince
*Assistant Examiner*—Frederick Shoon
*Attorney*—Beveridge & De Grandi ABSTRACT: A lighting device including a spectaclelike frame to be worn on the head and including a battery-powered light assembly on each temple member of the frame. The lights are capable of being focused individually to selectively illuminate either a single area or two separate areas.

PATENTED JAN 11 1972     3,634,676

INVENTOR
ANGELO CASTELLANO

BY Beveridge & De Grandi

ATTORNEYS

COMBINED SPECTACLE FRAME AND LIGHT

FIELD OF THE INVENTION

This invention relates to a lighting device which may be worn as spectacles on the head of the user, and more particularly to such a lighting device incorporating a light assembly on each temple member of a spectaclelike frame.

DESCRIPTION OF THE PRIOR ART

A portable lighting device which provides line-of-sight vision for the wearer is frequently quite useful, particularly in certain occupations where an individual is required to perform delicate tasks in a confined or relatively inaccessible and ill-illuminated area. For example, home appliance or television repairmen are frequently required to perform their tasks where adequate illumination in the work area is normally not available, making it necessary for the repairmen to employ flashlights, or other portable lighting devices. By providing line-of-sight illumination, substantially less light may be required, and numerous attempts have been made in the past to provide lighting devices in combination with spectacles, or spectaclelike frames, to provide line-of-sight illumination for the wearer. However, these prior art devices have not been entirely satisfactory for many reasons. For example, many of these prior devices used complex structure which proved impractical in operation, or were too heavy to be comfortably worn on the head. Further, many of the devices were incapable of being focused, or employed only a single light source with consequent limitations on the illuminating ability.

SUMMARY OF THE INVENTION

An object of the present invention is to overcome the defects of the prior art devices by providing a lightweight illuminating device which is simple and highly effective in its operation.

Another object of the invention is to provide an illuminating device employing a spectaclelike frame with a separate lighting assembly mounted on each temple member of the frame, and incorporating means for focusing the individual lighting assemblies to permit the wearer to selectively illuminate a single area from two light sources, or two separate areas simultaneously.

The foregoing and other objects are accomplished in a lighting assembly employing a spectacle frame, either with or without optical lenses, with a pair of battery-powered light assemblies mounted one on each temple member of the spectacle frame. The light assemblies each includes an elongated battery compartment having a cylindrical sleeve rotatably mounted on its forward end, and a light head including a light bulb and reflector mounted on the end of the sleeve for rotation about an axis inclined with respect to the axis of rotation of the sleeve. The light bulb and reflector are mounted in the light head so that the axis of a beam of light therefrom is inclined at an acute angle with respect to the axis of rotation of the light head on the sleeve member. By rotating the light head relative to the sleeve member, and rotating the sleeve member about its own axis, the light beam may be focused at any desired point which may be comfortably viewed by the wearer of the device.

BRIEF DESCRIPTION OF THE DRAWINGS

The foregoing objects and advantages of the invention are attained in a lighting device illustrated in the accompanying drawings, in which.

DESCRIPTION OF A PREFERRED EMBODIMENT

Figure 1:
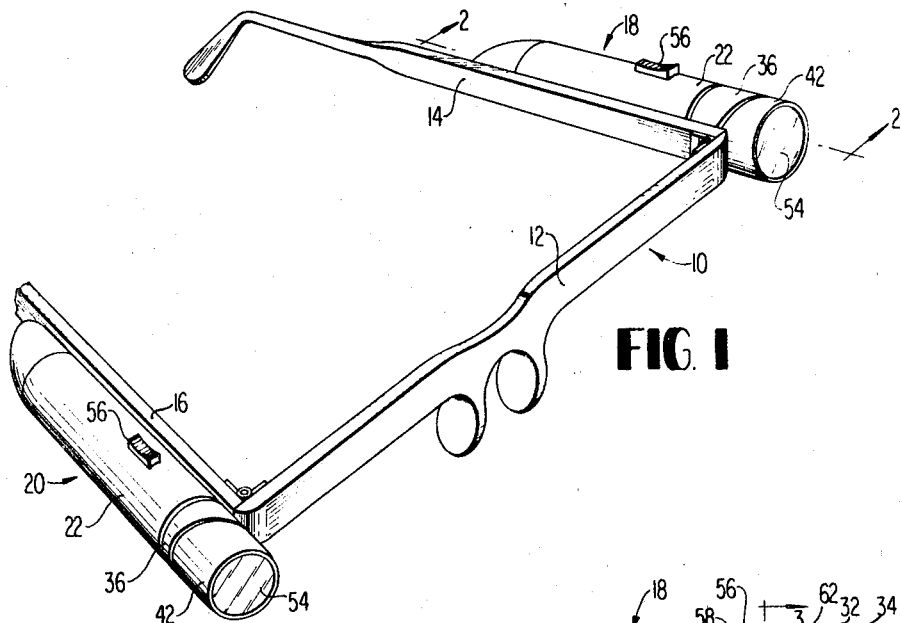
FIG. 1 is a perspective view of a lighting device embodying the invention.

Referring now to the drawings in detail, a lighting device embodying the invention is illustrated in FIG. 1 as including a spectacle frame assembly 10 made up of a bow member 12 and left and right temple members 14, 16, respectively, hingedly mounted to the ends of bow 12 in the conventional manner. The spectacle frame assembly is illustrated without the conventional optical lenses, though it is believed apparent that such lens elements could be readily mounted on the bow 12 in the conventional manner without in any way impairing the operation of the lighting device.

A light assembly 18 is rigidly mounted on the vertical outboard face of temple member 14, and a second identical light assembly 20 is rigidly mounted on the outboard vertical face of temple member 16. Since light assemblies 18 and 20 are identical, only light assembly 18 will be described in detail, it being understood that the description applies equally to light assembly 20.

Figure 2:
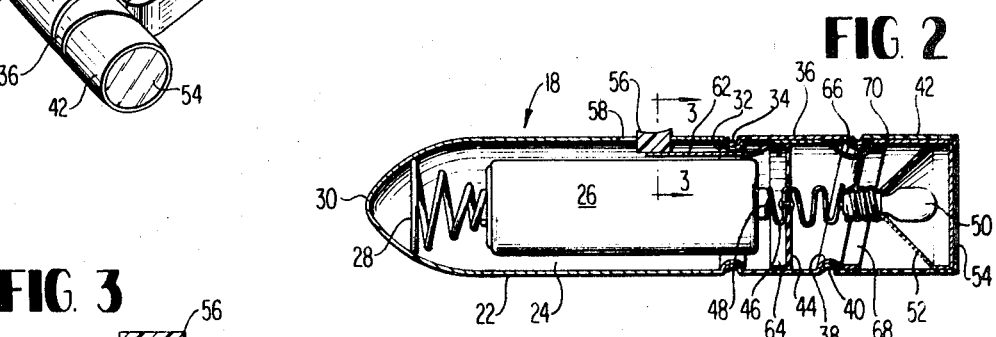
FIG. 2 is a sectional view taken along line 2—2 of FIG. 1.

As best seen in FIG. 2, light assembly 18 includes an elongated hollow metal body 22 defining a battery compartment 24 for receiving a single dry cell battery 26. A conical spring 28 positioned in the closed end 30 of the metal body member 22 resiliently urges battery 26 toward the forward open end of the battery compartment. An inwardly directed concavoconvex channel 32 is integrally formed in body member 22 adjacent its open end, and a complementary concavoconvex channel 34 formed in the open rear end of a cylindrical sleeve member 36 telescopingly receives the channel 32. Sufficient radial tolerance is provided between the outer concave surface of channel 32 and the inner convex surface of channel 34 to permit free relative rotation between the body 22 and the sleeve 36; however, the channels are axially interlocked so that sleeve 36 becomes, in effect, a rotatable axial extension of the hollow cylindrical body portion 22.

Sleeve member 36 terminates in an open end defined by a plane which is disposed at an acute angle with respect to the longitudinal axis of the sleeve. A second concavoconvex channel is formed in and extends around sleeve 36 adjacent its forward, inclined end to receive a complementary concavoconvex channel 40 formed adjacent the open rear end of a second cylindrical sleeve member 42. The rear open end of sleeve 42 is defined by a plane disposed at an acute angle with respect to the longitudinal axis of sleeve 42, which acute angle is substantially equal to the angle between the longitudinal axis of sleeve 36 and the plane defining its open end.

Since sleeves 36 and 42 have substantially cylindrical outer surfaces, the forward open end of channel 36 and the rear open end of channel 42 are slightly elliptical in their respective planes due to the fact that these planes are inclined with respect to the longitudinal axis of the cylindrical sleeves. Similarly, the channels 38 and 40 are slightly elliptical so that, in order to provide for relative rotation of sleeves 36 and 42, it is, of course, necessary to make special provisions to accommodate the slightly elliptical configuration of these interlocked channels. This may be accomplished by providing slightly greater radial clearance between the inner surface of channel 40 and the outer surface of channel 38, in the case where sleeves 36 and 42 are substantially rigid. Alternatively, one or both of the sleeves 36 and 42 may be made of a slightly flexible material to permit the channels to be distorted slightly upon relative rotation of the two sleeves. This latter construction may be accommodated by forming one or both of the sleeves from a slightly resilient plastic material. Preferably, a combination of the two constructions is employed since such a combination will provide a slight resistance to rotation, thereby retaining the two components in the desired relative positions, yet will not require excessive flexing of the sleeves.

Again as viewed in FIG. 2, sleeve 36 has mounted therein a diaphragm member 44 which supports a folded leaf spring element 46 in position to make electrical contact with the positive terminal 48 of battery 26. Spring 46 projects through diaphragm 44 and extends forwardly to resiliently contact the base of light bulb 50 which is threadably retained by a substantially parabolic reflector 52 mounted within the open end of sleeve 42. A transparent lens or cover plate 54 is mounted within the forward end of sleeve 42 to protect bulb 50. The bulb 50 and reflector 52 are mounted concentrically within sleeve 42 with the parabolic axis of reflector 52 projecting coaxially with the longitudinal axis of sleeve 42.

Figure 3:
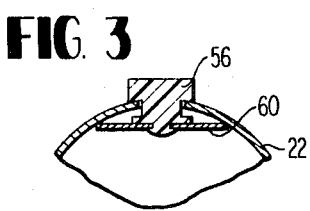
FIG. 3 is a fragmentary sectional view taken along line 3—3 of FIG. 2.

To complete the electric circuit to bulb 50, a block of insulating material 56 is slidably mounted in an elongated slot 58 in the sidewall metallic body member 22, and a flat metal contact plate 60 is rigidly mounted on block 56 for sliding movement therewith. As shown in FIG. 3, plate 60 extends laterally from block 56 to make contact with the sidewall of metal body 22. Metal plate 60 includes a forwardly extending arm portion 62 which projects into the rearward end of sleeve 36 in position to contact a metal slipring 64 mounted within the sleeve adjacent diaphragm 44. Slipring 64 has integrally formed thereon a resilient contact arm element 66 which projects forwardly through diaphragm 44 and terminates within the rear end portion of sleeve 42 in sliding contact with a second slipring 68. A metal contact member 70 completes a circuit from slipring 68 to the metal reflector element 52 which is in contact with the outer threaded portion of the base of bulb 50. In the position of the element shown in FIG. 2, the electric circuit is complete and the bulb would be ignited. To break the electric circuit, it is only necessary to slide the block 56 toward the rear to retract contact member 62 from engagement with slipring 64.

Figure 4:
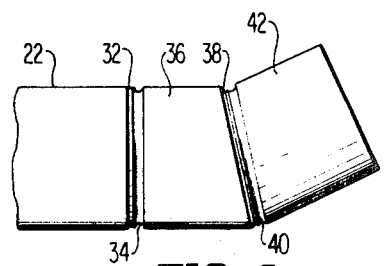
FIG. 4 is a fragmentary plan view of one of the lighting assemblies illustrating the adjustable feature thereof.
Figure 5:
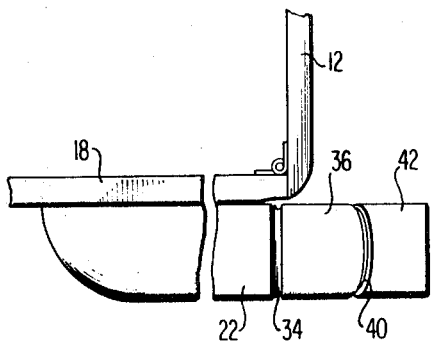
FIG. 5 is a fragmentary bottom plan view of a portion of the assembly shown in FIG. 1.

With the components in the position shown in FIGS. 1 and 2, the light beams from the light assemblies 18 and 20 are each directed straight forward along the longitudinal axis of body 22. However, as illustrated in FIG. 4, by rotation of sleeve 42 about its axis of rotation (which is perpendicular to the plane of the connection defined by channels 38 and 44), the longitudinal axis of sleeve 42, and consequently the parabolic axis of reflector 52, will be deflected from the longitudinal axis of body 22 and sleeve 36. It should be apparent that the extent of this deflection will be determined by the extent of rotation of sleeve 42 relative to sleeve 36, varying from zero in the position of the components illustrated in FIG. 2 to a maximum when sleeve 42 is rotated 180° from the position of FIG. 2, as illustrated in FIG. 4. Further, it will be apparent that the light beam, thus deflected, can be aimed in any direction about the longitudinal axis of sleeve 36 by the simple expedient of rotating sleeve 36 relative to body member 22. Thus, by proper positioning of sleeves 36 and 42, the individual lights may be focused at any point within a cone having an angle at its vertex which is equal to two times the angle at which the plane of the connection defined by channels 38, 40 intersect the longitudinal axis of sleeve 36. Since the individual lights may be focused separately, it is apparent that they may be employed to illuminate a single point from two spaced points or, alternatively, may be focused on two separate points as the wearer desires.

While I have disclosed a preferred embodiment of my invention, I wish it understood that I do not intend to be restricted solely thereto, but that I do intend to include all embodiments thereof which would be apparent to one skilled in the art and which come within the spirit and scope of my invention.

I claim:

1. A lighting device comprising a spectaclelike frame to be worn on the head and including a bow and a pair of temple members mounted one at each end of said bow, a pair of battery-powered light assemblies mounted one on each said temple member, said light assemblies each including an elongated hollow body defining a battery compartment, said body being of circular cross section at least adjacent its forward end, a first substantially cylindrical sleeve, first connector means mounting one end of said first sleeve on the forward end of said body for rotation thereon about the longitudinal axis of said first sleeve, the other open end of said sleeve being substantially elliptical and lying in a plane inclined with respect to the normal to said longitudinal axis of said body, a light head including a second substantially cylindrical sleeve having one substantially circular end lying in a plane perpendicular to its longitudinal axis and its other open end generally elliptical and lying in a plane inclined with respect to its longitudinal axis, a light bulb and a reflector mounted in said second sleeve adjacent said circular end thereof, second connector means mounting said light head on said first sleeve for rotation about an axis inclined at an acute angle with respect to said longitudinal axis of said first sleeve with said substantially elliptical ends of one of said sleeves telescoping into the substantially elliptical end of the other sleeve, said second connector means including interlocking concavoconvex grooves formed in said first and second sleeves adjacent said substantially elliptical ends thereof, said interlocking grooves lying in a plane inclined at an acute angle with respect to the longitudinal axis of said sleeves and including means permitting at least limited relative rotation between said sleeves, and means providing an electrical circuit from a battery in said battery compartment to said bulb.

2. In a lighting device as defined in claim 1, the further improvement wherein said reflector is a substantially parabolic reflector with its axis disposed at a second angle with respect to said second axis.

3. In a lighting device as defined in claim 2, the further improvement wherein said second angle is substantially equal to said first angle.

4. In a lighting device as defined in claim 1, the further improvement wherein said connecting means comprises interlocking concavoconvex annular grooves formed on contiguous ends of said body and said first sleeve, said grooves permitting relative rotational movement while preventing relative axial movement therebetween.

5. In a lighting device as defined in claim 1, the further improvement wherein at least one of said sleeves is formed of a resilient material to permit the substantially elliptical end thereof to distort sufficiently to permit relative rotation between said sleeves.

6. In a lighting device as defined in claim 5, the further improvement wherein said electric circuit comprises a slipring mounted in at least one of said cylindrical sleeves adjacent its substantially elliptical end.

* * * * *